(12) United States Patent
Schwarzwalder, Jr.

(10) Patent No.: US 6,812,860 B1
(45) Date of Patent: Nov. 2, 2004

(54) SYSTEM AND METHOD OF PROVIDING INFORMATION TO AN ONBOARD INFORMATION DEVICE IN A VEHICLE

(75) Inventor: Robert Nathan Schwarzwalder, Jr., Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 451 days.

(21) Appl. No.: 09/532,579

(22) Filed: Mar. 22, 2000

(51) Int. Cl.[7] .............................................. G08G 1/123
(52) U.S. Cl. ........................... 340/995.18; 340/995.24; 701/208
(58) Field of Search ................................ 340/905, 995, 340/988, 990, 995.18, 995.1, 995.12, 995.24; 701/200, 209, 210, 208

(56) References Cited

U.S. PATENT DOCUMENTS

| | | | | |
|---|---|---|---|---|
| 5,648,768 A | * | 7/1997 | Bouve ......................... | 340/995 |
| 5,774,827 A | * | 6/1998 | Smith, Jr. et al. ........... | 340/995 |
| 5,774,828 A | * | 6/1998 | Brunts et al. ................ | 340/995 |
| 5,778,367 A | | 7/1998 | Wesinger, Jr. et al. ....... | 707/10 |
| 5,930,474 A | * | 7/1999 | Dunworth et al. ..... | 395/200.47 |
| 6,014,090 A | * | 1/2000 | Rosen et al. ................. | 340/905 |
| 6,029,110 A | * | 2/2000 | Zuber et al. ................. | 701/200 |
| 6,148,261 A | * | 11/2000 | Obradovich et al. ........ | 340/995 |

FOREIGN PATENT DOCUMENTS

WO    WO 95/19030    7/1995

* cited by examiner

Primary Examiner—Brent A. Swarthout
(74) Attorney, Agent, or Firm—Damian Porcari

(57) ABSTRACT

A system and method of providing information to an onboard information device in a vehicle includes an onboard information device, such that the onboard information device is a handheld computer and a user interest profile is maintained within a memory of the onboard information device. The system includes an onboard communication system operatively connecting to the onboard information device, such that the; onboard communication system determines a location of the user from a positioning signal transmitted by a global positioning system. The system also includes a travel information system in communication with the onboard information device, such that the travel information system maintains a hierarchically indexed information database and the travel information system provides the onboard communication device with information of interest to the user based on the user profile and the user location.

16 Claims, 1 Drawing Sheet

SYSTEM AND METHOD OF PROVIDING INFORMATION TO AN ONBOARD INFORMATION DEVICE IN A VEHICLE

BACKGROUND OF THE INVENTION

1. Field of the Invention

The present invention relates generally to telematics and, more specifically, to a system and method of providing information to an onboard information device in a vehicle.

2. Description of the Related Art

Telematics and the related field of infomatics involves the delivery of information to a vehicle. It is known to provide geographically related information to the vehicle in the form of roadside assistance, maps and the like through an onboard communication system in the vehicle. Several types of communication systems are currently available that offer a user access to information within the vehicle. For example, a cellular phone provides information access using wireless communications. The cellular phone may also provide Internet access to receive real time information. However, the user must know their location and subscribe to a cellular phone service in order to receive geographically specific information.

Another type of onboard communication system is a global positioning system (GPS) within the vehicle that automatically determines the location of the vehicle for the user. The global positioning system includes a signal transmitter, a signal receiver, and a signal processor. The GPS, as is known in the art, utilizes the concept of time-of-arrival ranging to determine the position of a user. The global positioning system includes a signal receiver in communication with a space satellite transmitting a ranging signal. The position of the user can be determined by measuring the time it takes for a signal transmitted by the satellite at a known location to reach the user receiver in an unknown location. By measuring the propagation time of signals transmitted from multiple satellites at known locations, the position of the user can be determined. NAVSTAR GPS is an example of a GPS that provides world-wide three dimensional position and velocity information to users with a receiving device from twenty four satellites circling the earth twice a day.

Incorporating a GPS receiver in a vehicle as part of an onboard communication system facilitates communication between the vehicle and a central communication receiving location. Advantageously, the onboard communication system automatically locates the vehicle and provides the vehicle driver with assistance in a variety of circumstances. This type of information is beneficial if the driver requires roadside assistance or map directions in an unfamiliar location. An example of an onboard communication system in a vehicle is a Remote Emergency Satellite Cellular Unit (RCSCU) by the Lincoln Division of the Ford Motor Company. RESCU provides access to roadside emergency service and travel information via two overhead console buttons and cellular phone communication. While a GPS based onboard communication system in a vehicle works well to locate the vehicle and provide information from the vehicle, it does not provide real-time information to the vehicle.

It is also known in the art to provide a handheld information device that provides travel related information for a geographic location. An example of such a device is called Earthmate by Delorme Mapping. However, these devices require that the user input a location in order to receive geographically related. information regarding the location. These devices provide raw data and the user must search through all the information for information content of particular interest.

It is further known in the art to provide a personal handheld computer, also referred to as a personal digital assistant (PDA), that has internet access capabilities. An example of a personal handheld computer is a Palm Connected Organizer produced by Palm, Inc. As with a cellular phone, a PDA with Internet access allows a user to visit a web site on the Internet that supplies geographically related information. However, an Internet connection via a cellular phone or PDA requires significant user interaction in order to obtain specific information of interest. Thus, there is a need in the art for a method of providing information, such as geographically specific information based on a user profile, to an onboard information device in a vehicle with minimal user interaction.

SUMMARY OF THE INVENTION

Accordingly, the present invention is a system and method of providing information to an onboard information device in a vehicle. The system includes an onboard information device, such that the onboard information device is a handheld computer and a user interest profile is maintained within a memory of the onboard information device. The system includes an onboard communication system operatively connected to the onboard information device, such that the onboard communication system determines a location of the user from a positioning signal transmitted by a global positioning system. The system also includes a travel information system in communication with the onboard information device, such that the travel information system maintains a hierarchically indexed information database and the travel information system provides the onboard communication device with information of interest to the user based on the user profile and the user location.

The method includes the steps of determining a user interest profile, and storing the user profile in a memory of an onboard information device. The method also includes the steps of receiving information by a travel information system and hierarchically segmenting the information in the travel information system, such that the information is indexed by subject matter and geographic location and stored in a database in the travel information system. The method further includes the steps of activating the onboard information device to determine a location of the user using a positioning signal from a global positioning system and providing the user with information of interest to the user from the travel information system database based on the location of the user and the user profile.

One advantage of the present invention is that a system and method of providing information to an onboard information device in a vehicle is provided that automatically delivers real-time information to a user based on a predetermined user profile and the user's geographic location. Another advantage of the present invention is that the system and method provides geographically oriented information of interest to a user from a database containing hierarchically indexed geographic information. Still another advantage of the present invention is that the system and method utilizes a user generated profile that contains unique interests and information requirements for the user. A further advantage of the present invention is that system and method provides information to the user in the vehicle with minimal user interaction. Still a further advantage of the present invention is that the system and method cooperates with the onboard communication system within the vehicle to automatically identify the user's geographical location, and to provide the user the right information at the right time.

Other features and advantages of the present invention will be readily appreciated, as the same becomes better understood after reading the subsequent description taken in conjunction with the accompanying drawings.

DESCRIPTION OF THE PREFERRED EMBODIMENT(S)

Figure 1:
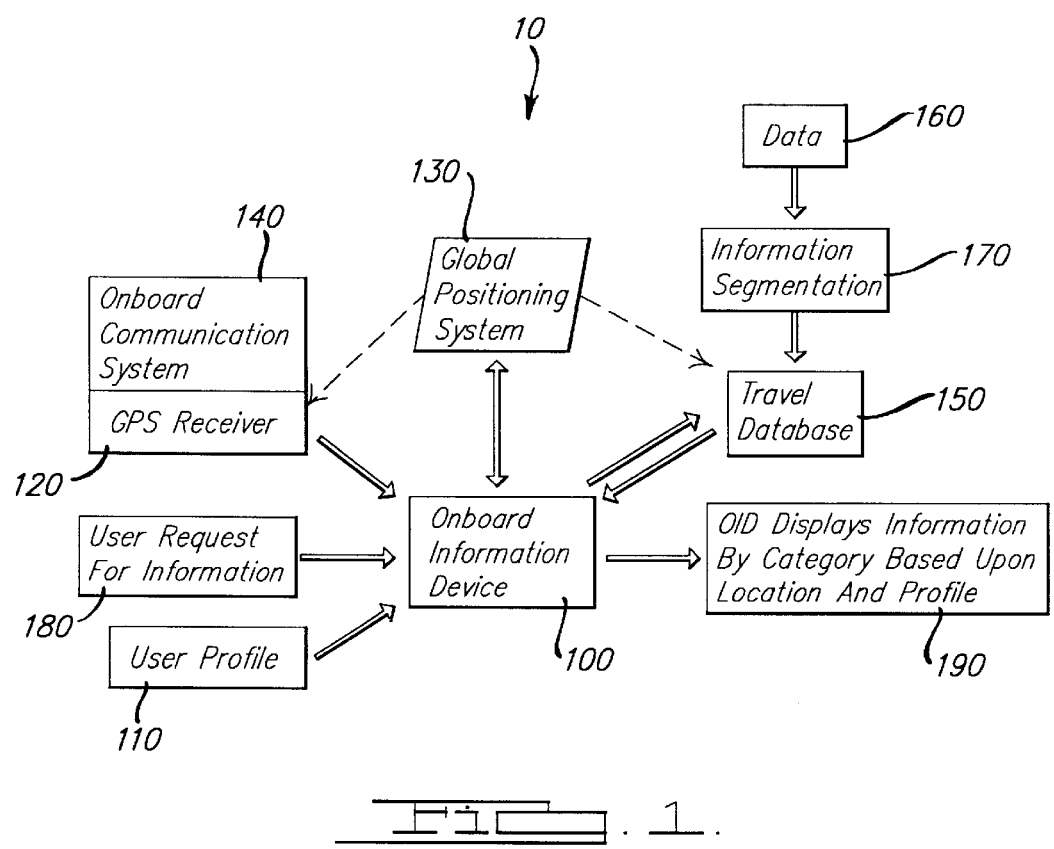
FIG. 1 is a block diagram illustrating a system and method, according to the present invention, of providing information to an onboard information device in a vehicle.

Referring to FIG. 1, a system and method, according to the present invention, of providing information to an onboard information device on a vehicle (not shown) is illustrated. Preferably, the information is geographically relevant and delivered to the vehicle, such as a motor vehicle. The system 10 includes an onboard information device 100, that receives and transmits information between a variety of sources to be described. The onboard information device 100 is operatively mounted within the vehicle. Preferably, the onboard information device 100 is located in the vehicle so that it is accessible to the driver. Further, the onboard information device 100 includes a display screen and input mechanism of sufficient size for the driver to operate with minimal distraction. Advantageously, the onboard information device 100 is detachable from the vehicle for additional user convenience and flexibility as a customized electronic travel reference guide.

Preferably, the onboard information device 100 is a handheld computer device having a display surface (not shown), an input mechanism (not shown), a power source (not shown), a memory and a controller (not shown), and a wireless communications interface (not shown). In this example, the display surface is a liquid crystal display, and is touch responsive for displaying characters or providing an input. An example of an input mechanism is a keypad. An example of a power source includes either a 12 volt DC input, such as the vehicle's 12 volt electrical system, or a rechargeable battery. The wireless communications interface is typical of an input port such as an infrared data link, and is capable of transmitting and receiving signals from various sources, to be described. It should be appreciated that the onboard information device may be compatible with a commercially available PDA, such as the PALM. It should also be appreciated that the onboard information device 100 may provide a cradle for the PALM, and the PALM and onboard information device 100 are in communication with each other via the communications interface.

The onboard information device 100 receives a user profile 110 as an input and stores it within its memory. Advantageously, the user profile 110 can be stored within a memory of a travel information system 150, to be described, and accessed by a unique user identification code. The user profile 110 maintains specifications for the type of information the user is interested in receiving. The user profile 110 may include a standard format of predetermined types of information for a specific locale, such as hotels, restaurants, weather, news or entertainment.

The user profile 110 can be customized by the user to reflect the user's interests and preferences. For example, the user may specify that only hotels within a predetermined price range be provided to the user by the onboard information device 100. similarly, the user may specify the type of sporting event information that is of particular interest, such as hockey or baseball. The user may also specify folders that the information can be categorized within, such as children's entertainment. Advantageously, if the user profile 110 is too narrowly defined for the system 10 to find a match, the system 10 can provide alternatives based on the user profile 110. Thus, the onboard information device 100 provides the user with the right information at the right time and in the right format from a travel information system 150.

The onboard information device 100 is operatively connected to a global positioning receiver 120. The global positioning receiver 120 is in communication with a global positioning system 130. The global positioning system 130 is a satellite based radionavigation system that provides global positioning and velocity determination. The global positioning system 130 includes a plurality of satellites strategically located in space that transmit a radio signal. The global positioning receiver 120 uses the signals from the satellites to calculate the location of the vehicle.

Preferably, the global positioning receiver 120 is part of an onboard communication system 140, that combines wireless communications with information transfer between the vehicle and a central receiving location. For example, the onboard communication system 140 includes a signaling device (not shown) that, when activated, such as by pressing a button, sends a signal to a central receiving location such as a travel information system 150. The travel information system 150 analyzes the signal from the global positioning system 130, to establish the vehicle location. Advantageously, the travel information system 150 can provide the driver of the vehicle with immediate roadside assistance if necessary. An example of an onboard communication system is ONSTAR, by Ford Motor Company.

The travel information system 150 includes a computer network that accesses and maintains geographically related information in a computer database. The travel information system 150 receives as an input data information 160 that is of interest to a traveler. Preferably the data or information 160 is geographically related and includes points of interest, news, weather, maps, business locations and hotel and restaurant reviews. The data or information 160 is electronically received from electronic sources such as internet based web sites, or electronic news wires.

The travel information system 150 takes the geographically related information and segments the information by indexing it by both subject and location, and arranges the information in a hierarchical manner 170. The geographically indexed information includes information pertaining to a specific locale, such as maps, businesses including restaurants and hotels, and entertainment venues. For example, a location can be segmented broadly, such as city, region or state, or narrowly, such as by neighborhood. The location segments 170 can be hierarchically arranged to ensure that the information 160 provided by the travel information system 150 matches the user's interests. A subject can similarly be segmented broadly, such as sports, or narrowly, such as baseball.

In operation, the system 10 prompts the user to input a user profile 110, such as by using the keypad or touching the display screen. As shown at 180, the user selects an information option on the onboard information device 100 such as by touching an icon on the display screen or pressing a key on the keypad. The onboard information device 100 activates the global positioning receiver 120 to receive a signal from the global positioning system 130. The onboard communication. system 140 determines the location of the vehicle from the signal transmitted by the global positioning system 130, in this example. The position of the vehicle and the user's profile 110 is transmitted to the travel information system 150 as a database query. Alternatively, the user's identification code is transmitted to the travel information system 150 and the user profile 110 is retrieved therefrom. It should be appreciated that the data from block 160 and information segmentation in block 170 are dynamically updated. The travel information system 150 searches its hierarchically indexed geographic database for relevant information to the user, based on the user's profile 110. The relevant information is electronically transmitted from the travel information system 150 to the onboard information device 100. Preferably, the relevant information is stored in an appropriate folder in the memory of the onboard information device 100.

The user accesses and views the information stored in the onboard information device 100 in block 190 by selecting the type of information to be displayed, such as by subject matter or location. Preferably, the user makes a selection via touching an icon on the display screen or pressing a key on the keypad. Advantageously, the onboard information device 100 can be removed from the vehicle and used outside the vehicle as an electronic travel reference guide. It should be appreciated that the onboard information device 100 may include a keypad lock that prevents the use of the onboard information device 100 while the vehicle is in motion. It should also be appreciated that the onboard information device 100 may include an integrated wireless telecommunication device to provide the user with access to wireless communication. It should further be appreciated that, in combination with a voice-activated command interface, a user could utilize the geographically specific information, such as by calling a hotel to make an advance reservation.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A system of providing information to an onboard information device in a vehicle comprising:

an onboard information device, wherein the onboard information device is a handheld computer and a user interest profile is maintained within a memory of the onboard information device;

an onboard communication system operatively connected to the onboard information device, wherein the onboard communication system determines a user location from a positioning signal transmitted by a global positioning system;

a remote travel information system in communication with the onboard information device, wherein the travel information system maintains geographically related information and segments the geographically related information and indexes the geographically related information by subject and location and arranges the geographically related information in a hierarchical manner in a database; and said travel information system searches the database for relevant information to the user based on the user interest profile and user location and transmits the relevant information to the onboard communication device.

2. A system as set forth in claim 1 wherein the onboard information device is removable from the vehicle.

3. A system as set forth in claim 1 wherein the onboard information device includes a display mechanism, a power source, an input mechanism and a wireless communications interface.

4. A system as set forth in claim 1 wherein the user may customize the user profile based on the interests of the user.

5. A system as set forth in claim 1 wherein the onboard communication system includes a global positioning receiver and wireless communications between the vehicle and the travel information system.

6. A system as set forth in claim 1 wherein the global positioning system is a radionavigation system transmitting a signal for global positioning and velocity determination by a global positioning receiver.

7. A system as set forth in claim 1 wherein the travel information system is a computer network that receives information electronically and maintains the information in a computer database.

8. A system as set forth in claim 1 wherein the onboard information device includes a keypad lock that is activated when the vehicle is in motion.

9. A system as set forth in claim 1 wherein the onboard information device includes an integrated wireless communication mechanism to provide wireless communications.

10. A system of providing information to an onboard information device in a vehicle comprising:

an onboard information device, wherein the onboard information device is a handheld computer having a display mechanism, a power source, an input mechanism and a wireless communications interface and a memory;

a user interest profile maintained within the memory of the onboard information device, wherein the user profile can be customized based on the interests of the user;

an onboard communication system operatively connected to the onboard information device, wherein the onboard communication system includes a global positioning receiver for determining a location of the user from a positioning signal transmitted by a global positioning system;

a remote travel information system in communication with the onboard information device and the onboard communication system, wherein the travel information system electronically receives geographically related information and maintains the geographically related information and segments the geographically related information and indexes the geographically related information by subject and location and arranges the geographically related information in a hierarchical manner in a database; and said travel information system searches the database for relevant information to the user based on the user interest profile and user location and transmits the relevant information to the onboard communication device.

11. A system as set forth in claim 10 wherein the onboard information device is removable from the vehicle.

12. A system as set forth in claim 10 wherein the global positioning system is a radionavigation system transmitting a signal for global positioning and velocity determination by the global positioning receiver.

13. A system as set forth in claim 10 wherein the onboard information device includes a keypad lock that is activated when the vehicle is in motion.

14. A system as set forth in claim 10 wherein the onboard information device includes an integrated wireless communication mechanism to provide wireless communications.

15. A system as set forth in claim 10 wherein the user interest profile is maintained within the memory of the travel information system and the user profile is accessed via a user identification code.

16. A method of providing information to an information device in a vehicle, said method comprising the steps of:

determining a user interest profile;

storing the user profile in a memory of an onboard information device;

receiving information by a remote travel information system;

hierarchically segmenting the information in the travel information system, wherein the information is indexed by subject matter and geographic location and stored in a database in the travel information system;

activating the onboard information device to determine a location of the user using a positioning signal from a global positioning system;

searching the database for relevant information to the user based on the user interest profile and user location; and transmitting the relevant information from the remote travel information system to the onboard communication device.

* * * * *